United States Patent
Caceres et al.

(10) Patent No.: US 12,015,600 B2
(45) Date of Patent: *Jun. 18, 2024

(54) SYSTEM AND METHOD FOR PROVIDING A PRIVACY LAYER TO SECURE CLIENT DATA IN A NETWORK

(71) Applicant: Verizon Patent and Licensing Inc., Basking Ridge, NJ (US)

(72) Inventors: Manuel Enrique Caceres, Basking Ridge, NJ (US); Taussif Khan, Martinsville, NJ (US); Mauricio Pati Caldeira De Andrada, South Plainfield, NJ (US); Warren Hojilla Uy, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,949

(22) Filed: Feb. 2, 2022

(65) Prior Publication Data
US 2022/0158981 A1 May 19, 2022

Related U.S. Application Data

(63) Continuation of application No. 16/410,652, filed on May 13, 2019, now Pat. No. 11,258,773.

(51) Int. Cl.
*H04L 9/40* (2022.01)
(52) U.S. Cl.
CPC .......... *H04L 63/045* (2013.01); *H04L 63/062* (2013.01); *H04L 63/0853* (2013.01); *H04L 63/0876* (2013.01); *H04L 63/0272* (2013.01)

(58) Field of Classification Search
CPC . H04L 63/045; H04L 63/062; H04L 63/0853; H04L 63/0876; H04L 63/0272
See application file for complete search history.

(56) References Cited

U.S. PATENT DOCUMENTS

| | | | | |
|---|---|---|---|---|
| 7,870,153 B2* | 1/2011 | Croft | ..................... | G06F 16/748 |
| | | | | 709/219 |
| 7,949,871 B2* | 5/2011 | Randle | ................ | H04L 63/0869 |
| | | | | 713/153 |
| 2009/0086977 A1* | 4/2009 | Berggren | .............. | H04L 9/3263 |
| | | | | 380/279 |

\* cited by examiner

*Primary Examiner* — Khoi V Le

(57) ABSTRACT

A device may receive a request to establish a virtualized environment to support a session for a client device in communication with the computing device over a network. The device may instantiate the virtualized environment in a trusted execution environment of the device, wherein the trusted execution environment may include one or more hardware resources that isolate the virtualized environment from a rich execution environment associated with the device. The device may cause a hardware security module associated with the device to obtain one or more cryptographic keys by communicating with a secure element of the client device, and the device may secure communication between a local operating system executing on the client device and the virtualized environment instantiated in the trusted execution environment using the one or more cryptographic keys.

20 Claims, 6 Drawing Sheets

SYSTEM AND METHOD FOR PROVIDING A PRIVACY LAYER TO SECURE CLIENT DATA IN A NETWORK

RELATED APPLICATION

This application is a continuation of U.S. patent application Ser. No. 16/410,652, entitled "SYSTEM AND METHOD FOR PROVIDING A PRIVACY LAYER TO SECURE CLIENT DATA IN A NETWORK," filed May 13, 2019, which is incorporated herein by reference in its entirety.

BACKGROUND

Virtual desktop infrastructure (VDI), sometimes referred to as server-based computing, refers to a computing model in which virtualization technology is used to host a desktop environment on a network device (e.g., in a virtual machine, a container, and/or the like) rather than running the desktop environment locally on a user device. User events (e.g., keystrokes, mouse movements, and/or the like) may be sent to the network device over a network connection, and the network device may perform calculations and return images or other graphical data representing the desktop environment to the user device. Accordingly, the images or other graphical data may be rendered at the user device, which may allow the user to interact with an operating system and one or more applications executing in the desktop environment as though the operating system and applications were running locally on the user device.

DETAILED DESCRIPTION OF PREFERRED EMBODIMENTS

Figure 1A:
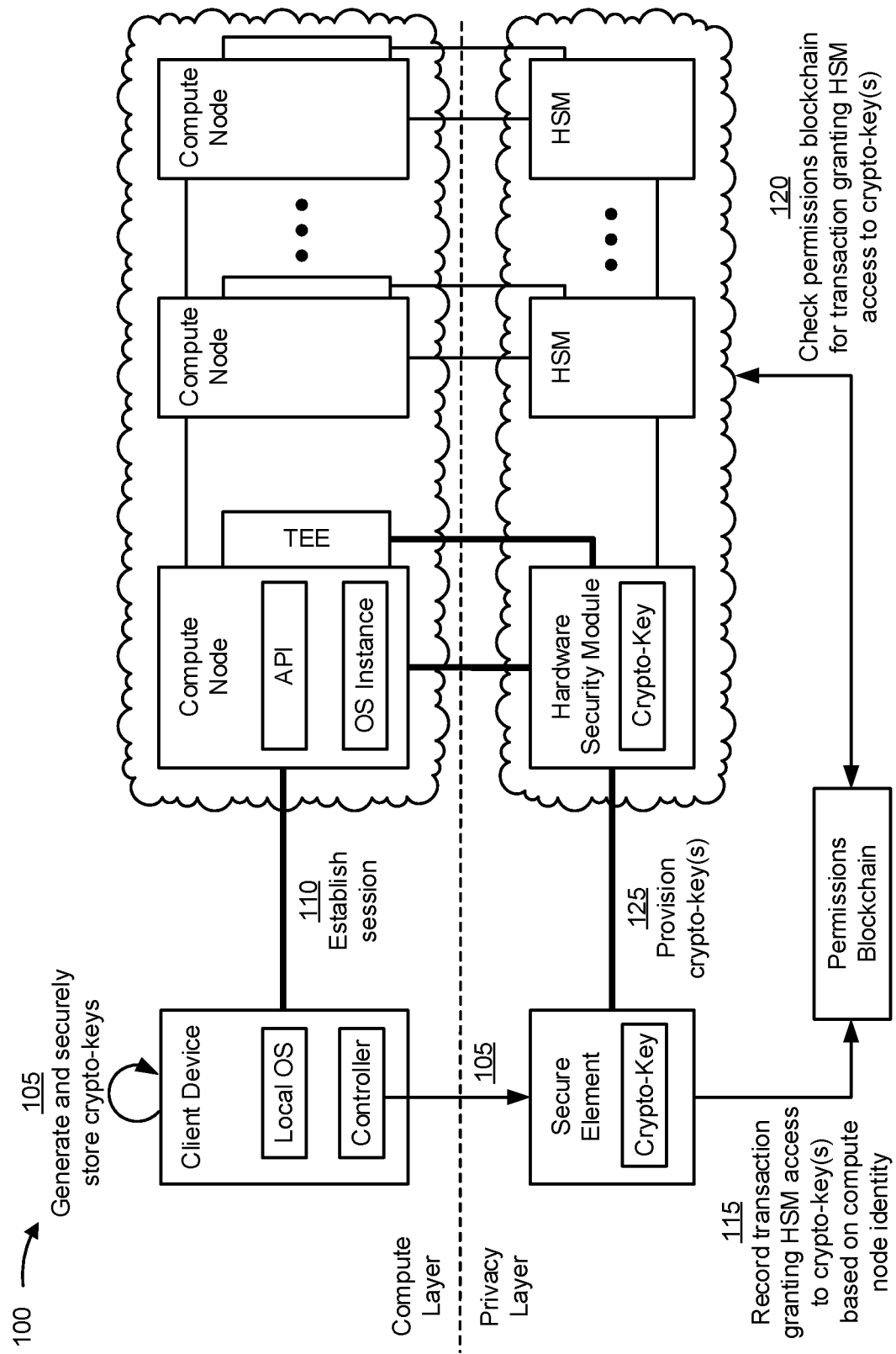
FIGS. 1A-1C are diagrams of one or more example implementations described herein.

The following detailed description of example implementations refers to the accompanying drawings. The same reference numbers in different drawings can identify the same or similar elements.

Desktop virtualization may be used in computing paradigms that separate a desktop environment and applications that run in the desktop environment from a physical client device that is used to access and interact with the desktop environment. For example, in a virtualized desktop environment, most or all desktop components are executed on a network device using virtualization technology (e.g., virtual machines, containers, and/or the like). Accordingly, the physical client device may interact with the virtualized desktop environment by sending information (e.g., input events) to the network device and receiving information (e.g., images representing a state of the desktop environment) from the network device.

In this way, processing data associated with the desktop environment may be offloaded onto the network device, which may conserve various computing resources (e.g., processing resources, memory resources, battery resources, and/or the like) on the physical client device. Furthermore, this approach may support data availability strategies because data associated with the desktop environment is saved and backed up on the network device. For example, if a user were to lose a physical device used to interact with the desktop environment, the desktop environment can be restored in a straightforward and simple manner because the data is backed up on the network device. Furthermore, because most or all data is processed and stored on the network device, desktop virtualization can offer certain security assurances in that there is a smaller chance that critical data can be retrieved and compromised when a physical device is lost, stolen, or hacked because there is less data stored on the physical device.

Because desktop virtualization can be used to offload processing and storing data from a physical client device to a network device, desktop virtualization can be an attractive option for thin client devices that may have limited computational resources. For example, because hardware that is unrelated to user input and output and networking support can be removed from the device, thin client devices tend to be lightweight, energy-efficient, and less expensive than traditional desktop computers without compromising performance, as the thin client device instead derives compute power from more powerful network devices.

However, one challenge that can arise when using a client device (e.g., a mobile device, a thin client device with limited hardware and/or capabilities, and/or the like) to interact with a virtualized desktop environment executing on a network device relates to latency. For example, when an input event (e.g., a keystroke, a mouse click) occurs at the thin client device, information related to the input event is sent to the network device, which processes the input event in the virtualized desktop environment prior to returning graphical results to the client device. Accordingly, there is an inherent latency of at least one round-trip time between the client device and the network device before the effect of the input event can appear on a screen at the client device. In scenarios where the client device is mobile, the client device may move further away from the network device supporting the virtualized desktop environment, which can increase the round-trip latency and potentially degrade Quality of Experience (QoE).

Furthermore, another issue that may arise when a virtualized desktop environment is executed on a network device relates to privacy (or a perceived lack of privacy) for data that is processed and stored on a network device. For example, users often have a perception that data stored on a local device is somehow more private and/or secure than data that is stored on a network device because malicious users may be more likely to attack a network device where access to data associated with many users can be illicitly obtained (e.g., just one attack vector is enough to compromise the data of many users). Furthermore, when data is stored and processed on a network device, there is a risk that the data could be internally compromised (e.g., by a network device user that intentionally or unintentionally views a thin client user's data, such as a system administrator abusing privileges). In another example, governments, law enforcement agencies, intelligence agencies, and/or the like may order security providers to provide access to user data and/or install backdoors. In cases where a user has physical access to the device where data is stored (e.g., a thin client device), the data presumably cannot be accessed without the user's knowledge and/or consent because the device would need to be physically taken. In contrast, when the data is stored on a network device, there is a possibility that an unauthorized party may access data without the user's knowledge or consent. For example, because the virtualized desktop environment is typically executed in a virtual machine, container, and/or the like, the unauthorized party may capture a snapshot of the virtualized desktop environment and instantiate the snapshot elsewhere, thus gaining unauthorized access to the data without the user knowing that the snapshot was captured.

Some implementations described herein may utilize various tamper-resistant hardware components to securely store and process user data on one or more network devices to provide security and privacy assurances that the user data cannot be stolen, hacked, or otherwise compromised. Furthermore, in some implementations, the one or more network devices may be located in an edge region of a network to provide low-latency response times to support application workloads (e.g., virtualized desktop environments) associated with user data stored and processed on the one or more network devices. For example, a client device may offload one or more application workloads to a network compute node, which may be one of a plurality of network compute nodes deployed in a multi-access edge computing (MEC) environment, a decentralized fog computing environment, a public or private cloud computing environment, a data center, a compute cluster, and/or the like.

In some implementations, each network compute node may be associated with a hardware security module (HSM), which may be similarly deployed in a MEC environment, a decentralized fog computing environment, a public or private cloud computing environment, a data center, a compute cluster, and/or the like, and each network compute node may include a trusted execution environment (TEE) to execute the application workload(s) offloaded to the network compute node in hardware that is isolated from a rich execution environment associated with the network compute node. The HSM associated with a particular network compute node may be used to store one or more cryptographic keys that are used to encrypt and decrypt data associated with the application workload(s) processed in the TEE associated with the corresponding network compute node, and the HSM may be granted permission to access and use the cryptographic keys based on a state of a blockchain controlled by the client device using one or more private or secret keys maintained in a secure element of the client device.

In this way, functions and/or components that are used to store and process data associated with the application workload(s) offloaded to the network compute node may be logically separated into a compute layer where the data is stored and processed, and a privacy layer that is used to ensure that unauthorized parties cannot access the data stored and processed in the compute layer. For example, the secure element of the client device and the HSMs may form the privacy layer, and the blockchain used to control access to the cryptographic keys may be configured such that only the client device can write entries to the blockchain. Furthermore, the TEE may be provided in the compute layer to perform processing and storage operations, with the HSM encrypting and decrypting data as needed to permit the TEE to perform processing and storage operations. In this way, there may be a chain of trust between the secure element of the client device, the HSM in the privacy layer associated with each network compute node, and the TEE in the compute layer associated with each network compute node, with the blockchain providing an immutable tamper-resistant mechanism to define policies and controls that regulate interactions among the secure element, the HSM, and the TEE.

Figure 1B:
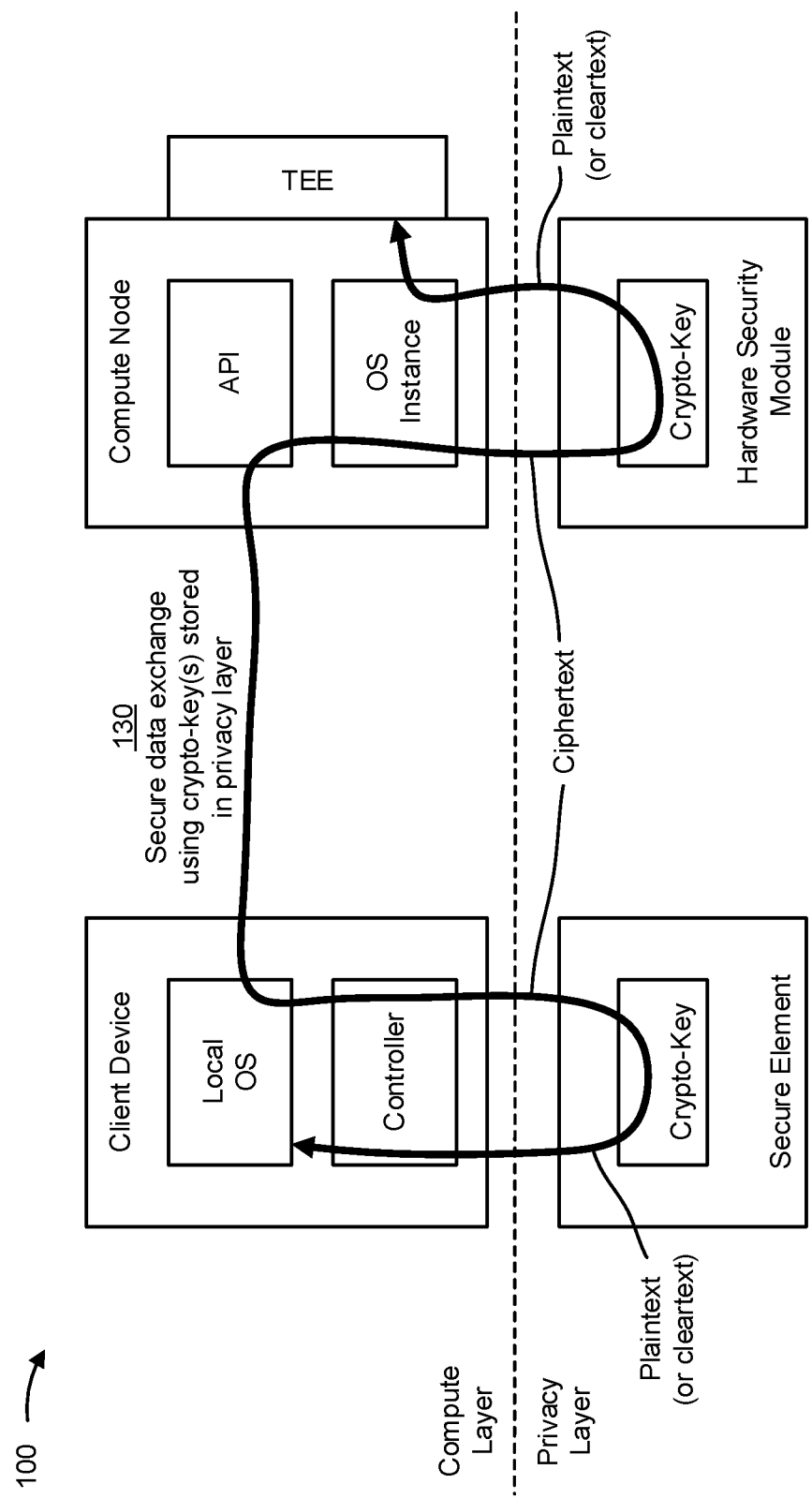
Figure 1C:
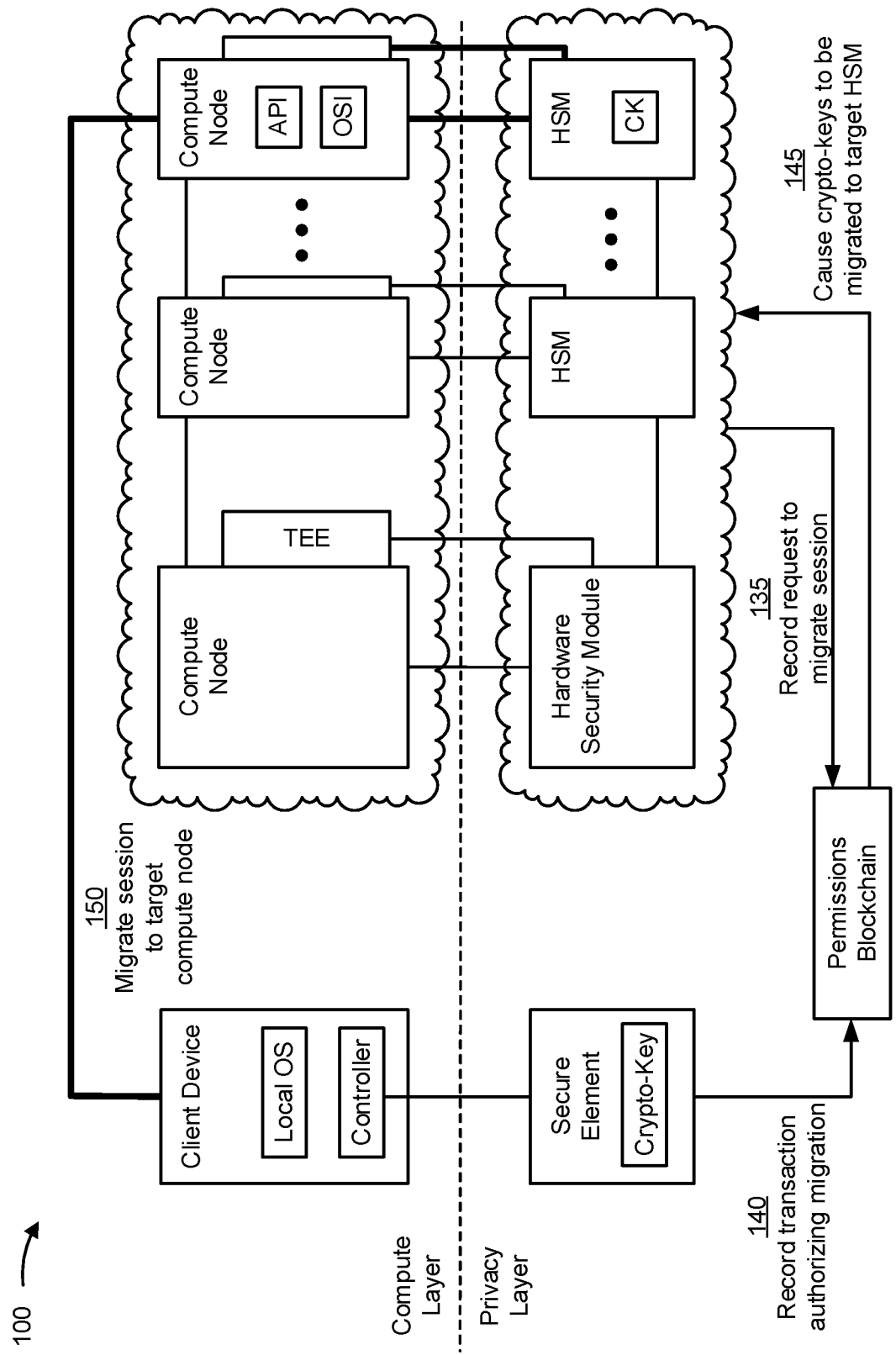

FIGS. 1A-1C are diagrams of one or more example implementations 100 described herein. As will be described in further detail herein, example implementation(s) 100 may include a client device that may offload one or more application workloads (e.g., a workload associated with executing a desktop environment) for processing by a set of compute nodes that are deployed on a network in a multi-access edge computing (MEC) environment, a decentralized fog computing environment, a public or private cloud computing environment, a data center, a compute cluster, and/or the like. Furthermore, example implementation(s) 100 may include a set of hardware security modules (HSMs), which are similarly deployed on the network in a MEC environment, a decentralized fog computing environment, a public or private cloud computing environment, a data center, a compute cluster, and/or the like. In some implementations, there may be a one-to-one mapping between each HSM and a corresponding compute node. For example, as will be described in further detail herein, the one-to-one mapping may ensure that data associated with the application workload(s) offloaded to the corresponding compute node cannot be migrated to or otherwise accessed by a different compute node without the knowledge and/or consent of the client device.

As further shown in FIGS. 1A-1C, the client device may include a secure element to securely store one or more cryptographic keys, and the client device may have an exclusive right to record entries in a permissions blockchain that is used to control which HSM(s) can access the cryptographic keys to encrypt and decrypt data associated with the application workload(s) to be processed by the corresponding compute node (e.g., in a trusted execution environment (TEE) that includes one or more hardware resources to isolate data stored and/or processed in the TEE from a rich execution environment associated with the compute node.

For example, as shown in FIG. 1A, the client device may generate one or more cryptographic keys, which are securely stored in the secure element. Accordingly, when the client device establishes a session (e.g., a virtual desktop session) with a particular compute node, the client device may record a transaction in the permissions blockchain to grant the corresponding HSM access to the cryptographic keys. As shown in FIG. 1B, the cryptographic keys stored in the corresponding HSM can be used to encrypt data to be transmitted to the client device and to decrypt data to be processed by the TEE, which may provide various isolation mechanisms to ensure that plaintext or cleartext data is not accessible in the compute node. As shown in FIG. 1C, when the session is to be migrated to a target compute node (e.g., based on a mobility event, a maintenance event, a failover event, and/or the like), the HSM(s) in the privacy layer may record an entry in the permissions blockchain to request that the cryptographic keys be migrated to a target HSM mapped to the target compute node. In this way, the cryptographic keys used to encrypt and decrypt data associated with the session may be migrated in conjunction with the session data. Furthermore, the secure element, the HSM(s), the TEE(s), and the permissions blockchain may collectively provide various tamper-resistant mechanisms to secure the session data and ensure that unauthorized parties cannot access the session data.

As shown in FIG. 1A, and by reference number 105, the client device may use a suitable algorithm (e.g., Rivest- Shamir-Adleman (RSA), Elliptic-curve cryptography (ECC), Digital Signature Algorithm (DSA), and/or the like) to generate one or more cryptographic keys, which may include an asymmetric key pair used to secure various interactions in example implementation(s) 100. The asymmetric key pair may include a private key (sometimes called a "secret key") and a corresponding public key. The public key generated by the client device can be distributed to third parties (e.g., the compute nodes, HSM(s), and/or the like) without compromising security provided that the private key is kept secret. In general, the public key can be used to encrypt a message sent to the client device, and the encrypted message can be decrypted only with the corresponding private key. Additionally, or alternatively, the client device can use the private key to create a digital signature on a message transmitted by the client device, and another device receiving the message can use the public key to verify that the message was sent by the client device asserting ownership of the public key and to verify that the message was not modified during transit. As described in further detail elsewhere herein, the asymmetric key pair may be used to write and/or validate entries in the permissions blockchain. Furthermore, in some implementations, the cryptographic keys generated by the client device may include one or more symmetric keys (e.g., generated according to the Advanced Encryption Standard (AES), Data Encryption Standard (DES), and/or the like), one or more random and/or pseudorandom numbers, high-entropy seed data and/or initialization vectors for generating cryptographic keys, and/or the like.

In some implementations, the client device may generate and maintain the cryptographic keys in the secure element, which may include a secure storage container to host security data (e.g., cryptographic keys, username and password combinations, and/or the like). In particular, the secure element is a tamper-resistant platform (e.g., a microchip or microcontroller) that provides a dynamic environment in which application code, application data, and/or the like to enable secure storage, processing, communication with external entities, and/or the like. For example, the secure element may provide delimited memory for specific applications and/or functions that are allowed to encrypt, decrypt, digitally sign, and/or otherwise interact with data in the secure element. In some implementations, as mentioned above, the secure element may include various tamper-resistance and/or tamper-detection mechanisms to protect the data contained and/or processed in the secure element. For example, the tamper-resistance mechanisms may include conductive shield layers that hide electromagnetic radiation and power usage and/or prevent reading of internal signals to protect against side-channel attacks that rely on observing physical leakages and/or emissions, controlled execution to prevent timing delays that may reveal secret information, hardware-based capability registers to implement privilege separation, chain of trust systems to authenticate an operating system, an application, and/or the like prior to loading, and/or the like. Furthermore, the tamper-detection mechanisms may include power quality monitoring to detect brown-out events and other anomalies, sensors to detect shock and orientation changes, perimeter integrity circuits to detect breaks in circuits, automatic data zeroization if tampering is detected, and/or the like.

In some implementations, when the client device generates the asymmetric key pair, other entities in implementation(s) 100 may associate the public key with data belonging to the client device, and the private key may be securely maintained in the secure element. In some implementations, the permissions blockchain used to provide the HSM(s) with various policies and controls may be configured to require that entries granting access to the data belonging to the client device be signed using the private key. In this way, because only the private key maintained in the secure element of the client device can be used to grant access to data associated with the client device, the client device has an exclusive right to grant access to the data as long as the private key is not exposed outside the secure element.

As further shown in FIG. 1A, and by reference number 110, the client device may establish a session with a particular compute node in the set of compute nodes. For example, the session may be established to execute a virtualized desktop environment or to offload another suitable application workload from the client device to the compute node. In some implementations, the compute node may be associated with a unique identity, which may be transmitted to or otherwise obtained by the client device, and the unique identity associated with the compute node may be mapped to a particular HSM associated with the compute node.

As further shown in FIG. 1A, and by reference number 115, the client device may record a transaction in the permissions blockchain to grant the HSM associated with the compute node access to one or more cryptographic keys associated with the client device. For example, the client device may record the public key associated with the previously generated asymmetric key pair in the permissions blockchain and use the private key to sign a transaction that grants the HSM access to the one or more cryptographic keys. Accordingly, other entities (e.g., the HSM(s), external data providers, and/or the like) may use the public key of the client device to validate that transactions recorded in the permissions blockchain are signed using the private key of the client device, and validated transactions may be used to convey, to the appropriate HSM, the one or more cryptographic keys to be used to encrypt and/or decrypt data associated with the session for the client device.

For example, as further shown in FIG. 1A, and by reference number 120, the various HSMs that are mapped to the set of compute nodes may check the permissions blockchain (e.g., at periodic intervals, based on certain triggering events, and/or the like) to determine whether the permissions blockchain includes one or more transactions or other entries granting a particular HSM access to the cryptographic key(s) to be used to encrypt and/or decrypt data associated with the session for the client device. In the illustrated example, because the client device has established a session with a particular compute node as indicated by reference number 110, the permissions blockchain may include a transaction granting the corresponding HSM access to the cryptographic key(s) to be used to encrypt and/or decrypt data associated with the session for the client device. Accordingly, as further shown in FIG. 1A, and by reference number 125, the HSM associated with the compute node supporting the session for the client device may be provisioned with the cryptographic key(s), and the HSM may encrypt and decrypt data associated with the session using the cryptographic keys, as described elsewhere herein.

In some implementations, the cryptographic key(s) provisioned to the HSM may include information related to one or more symmetric keys and/or one or more asymmetric keys. For example, in one use case, the HSM may generate an asymmetric key pair including a public key and a private key, and the public key may be communicated to the secure element of the client device. The secure element may generate a symmetric key and encrypt the symmetric key using the public key of the HSM, and the encrypted symmetric key may be communicated to the HSM. Accordingly, the HSM may decrypt the symmetric key using the private key that is known only to the HSM. Additionally, or alternatively, the HSM and the secure element may negotiate the symmetric key using a Diffie-Hellman key exchange, or another suitable method may be used to negotiate a shared secret key (e.g., exchanging seed data such as a random and/or pseudorandom number, a cryptographic salt, an initialization vector, and/or the like, and using the seed data to generate the cryptographic key). Additionally, or alternatively, one or more third-party data sources may provision the HSM with cryptographic keys to be used for data provided and/or consumed by the third-party data sources. Accordingly, the HSM associated with the compute node supporting the session for the client device may encrypt and decrypt data associated with the session using the provisioned cryptographic keys, and data associated with the session may be stored and processed in the trusted execution environment associated with the compute node to ensure that unauthorized parties cannot access data associated with the session.

Accordingly, the privacy layer in example implementation(s) 100 includes a set of HSMs that are used to protect the cryptographic keys, and the HSMs may include tamper-resistant hardware and logical security controls to protect sensitive data in transit, in use, and/or at rest. In this way, if a malicious user were to steal an HSM (e.g., from a data center) or otherwise obtain access to an HSM, the malicious user will be unable to extract any data from the HSM even if the malicious user were to perform a hardware attack such as putting the HSM in an X-ray scanner. Furthermore, the HSMs have logical security controls to prevent hacking, even by users that have access to an interface of the HSMs. Accordingly, the HSMs may provide high-level security assurance, and in combination with the trusted execution environment, can ensure that unauthorized parties cannot access data associated with the session for the client device.

For example, the trusted execution environment (TEE) may reside in an isolated area on a main processor of the compute node, and the isolated area may be separated from a rich execution environment of the compute node that is used to execute a main operating system and related applications. Trusted applications that are instantiated or otherwise executed in the TEE may have full access to the computing resources of the compute node (e.g., processing resources, memory resources, peripheral devices, and/or the like), and hardware isolation may protect the trusted applications from other applications that may be running in parallel in the rich execution environment. The TEE may establish a trust relationship between the compute node and the associated HSM, and the HSM may rely upon the trust relationship when permitting the TEE on the associated compute node to use the cryptographic keys stored in the HSM to encrypt and decrypt data associated with the session for the client device. The trust relationship between the TEE and the HSM allows the TEE to interface with the HSM to send data to the HSM to be encrypted (e.g., prior to transmitting the encrypted data to the client device) and/or to send data to the HSM to be decrypted (e.g., prior to processing the decrypted data in the TEE).

In some implementations, the HSMs and the compute nodes may be co-located in an edge region of a network or located in physical proximity to one another and/or the client device. In this way, data associated with the session for the client device can satisfy one or more performance requirements (e.g., low-latency) for the session. Furthermore, having the compute nodes and the HSMs co-located and/or located in physical proximity to one another may allow the compute nodes in the compute layer to interface with the HSMs in the privacy layer. In some implementations, the HSMs in the privacy layer may be interconnected via a network connection (e.g., a Transmission Control Protocol (TCP) connection), and the various HSMs may be configured to establish virtual private network (VPN) tunnels to support administration via a control plane. For example, the administration via the control plane may be used to identify HSMs that are operating in the privacy layer, HSMs that have been disabled or otherwise removed from the privacy layer, and/or the like.

As shown in FIG. 1B, and by reference number 130, the client device may securely exchange data with the compute node using the cryptographic keys that are stored in the privacy layer (e.g., in the secure element and the HSM associated with the compute node). For example, when data is to be transmitted from the client device to the compute node, a local operating system of the client device may generate the data to be transmitted, and a controller may pass the data to the secure element as plaintext, which refers to unencrypted data pending input into a cryptographic algorithm. The secure element may encrypt the plaintext data into ciphertext, which refers to data that has been encrypted or otherwise encoded in a manner that is indecipherable to a human or a computer that does not have the correct cryptographic key needed to decipher the data. The encrypted (ciphertext) data may be passed from the secure element to the portion of the client device logically residing in the compute layer, and the encrypted data may be securely transmitted to the compute node via communication with an application program interface (API) provided by the compute node. The compute node may pass the encrypted ciphertext data to the HSM for decryption using the previously provisioned cryptographic keys. Accordingly, the HSM may decrypt the data into cleartext, which refers to data to be transmitted, stored, and/or processed in an unencrypted form (e.g., in the TEE). For example, the compute node may instantiate one or more virtual machines, containers, and/or the like in the TEE, and the virtual machines, containers, and/or the like may be used to store and/or process decrypted cleartext data passed from the HSM to the corresponding TEE.

In a similar respect, when data is to be transmitted from the compute node to the client device, the TEE may generate the data to be transmitted to the client device, and the data to be transmitted to the client device may be passed to the HSM as plaintext pending input into a cryptographic algorithm. The HSM may encrypt the plaintext data into ciphertext, and the compute node may transmit the encrypted ciphertext data to the client device. Accordingly, the client device may pass the encrypted ciphertext data to the secure element for decryption using the local controller, and the secure element may decrypt the data using the cryptographic keys stored therein. Accordingly, the secure element may decrypt the data into cleartext to be stored and/or processed by the local operating system of the client device.

In this way, example implementation(s) 100 may include various tamper-resistant and trusted elements to distribute security and privacy protection functions among the various tamper-resistant and trusted elements. Accordingly, a user of the client device does not have to rely on a service provider of the compute node to ensure that data associated with the session for the client device is private and secure. Instead, the secure element, the HSM, and the TEE may provide secure hardware to implement various technological measures that may provide the user with privacy and security assurances, and the user of the client device can entrust an ecosystem of secure hardware that is manufactured and specifically configured to protect against security and/or privacy breaches. Furthermore, because the permissions blockchain controlled by the client device is used to define policies and controls indicating which particular HSM is allowed to have access to the cryptographic key(s) associated with the session, a malicious user who clones, snapshots, or otherwise copies an instance of the session running on the compute node and instantiates the instance on another compute node will be unable to access any data from the instance because the cryptographic keys needed to access the data are segregated and secured in the HSM associated with the compute node that is running the authorized instance of the session.

In other words, the permissions blockchain may be used to implement control plane functionality, as blockchain (or digital ledger) technology can confer tamper-resistance and immutable trust to guarantee that unauthorized entities cannot enter transactions into the permissions blockchain without the knowledge and/or consent of the client device (and/or a user of the client device). For example, as mentioned elsewhere herein, the permissions blockchain may allow only the client device to make entries that grant access to the cryptographic keys needed to encrypt and/or decrypt data associated with the client device by requiring that any such entries be signed using the private key of the client device. However, the permissions blockchain may further permit the HSM(s) in the privacy layer to enter certain transactions into the permissions blockchain for the purpose of migrating the session of the client device to another compute node.

For example, as shown in FIG. 1C, and by reference number 135, one or more of the HSMs in the privacy layer may record an entry in the permissions blockchain to request that the cryptographic keys used to encrypt and decrypt data associated with the session for the client device be migrated to a target HSM (e.g., based on determining that the session is to be migrated to a target computing node due to a mobility event, a maintenance event, a failover event, and/or the like). In general, the request may be recorded in the permissions blockchain to prompt the client device to modify the permissions recorded in the permissions blockchain such that the target HSM is granted access to the cryptographic keys used to encrypt and decrypt data associated with the session for the client device.

As further shown in FIG. 1C, and by reference number 140, the client device may record a transaction in the permissions blockchain to modify the identity of the HSM that is allowed to store the cryptographic keys used to encrypt and decrypt data associated with the session for the client device in a similar manner as described elsewhere herein. For example, in some implementations, the client device may use the cryptographic keys stored in the secure element to digitally sign a transaction that revokes the permission granted to the current hardware security module that is authorized to store the cryptographic keys associated with the client device and/or grants the target hardware security module permission to store the cryptographic keys associated with the client device.

As further shown in FIG. 1C, and by reference number 145, the cryptographic keys associated with the client device may be migrated to the target HSM. For example, to migrate the cryptographic keys, a virtual private network (VPN) tunnel between the current HSM and the target HSM may be established. Accordingly, the one or more cryptographic keys may be transmitted to the target HSM via the VPN tunnel, and the one or more cryptographic keys may be deleted from the previous HSM. Additionally, or alternatively, one or more new cryptographic keys may be established for the session to be migrated to the target HSM. For example, the target HSM may be provisioned with one or more cryptographic keys in a similar manner as described above (e.g., using a key exchange protocol such as Diffie-Hellman, by generating a symmetric key that is encrypted using a public key of the target HSM and decrypted using a private key of the target HSM, and/or the like). As further shown in FIG. 1C, and by reference number 150, the session may be migrated to the target compute node associated with the target HSM, and data associated with the session may be handled in a similar manner as described elsewhere herein. For example, data transmitted from the client device to the target compute node may be encrypted using the cryptographic keys stored in the secure element of the client device, and the encrypted data may be decrypted by the target HSM using the cryptographic keys stored in the HSM prior to storing and/or processing the decrypted data in the TEE of the associated compute node. In a similar respect, data to be transmitted to the client device may be passed from the TEE of the compute node to the associated HSM for encryption, and the encrypted data may be communicated to the client device, which may decrypt the data using the cryptographic keys stored in the secure element of the client device.

In this way, based on the trust relationship between the tamper-resistant secure element in the privacy layer, the HSM(s) in the privacy layer, and the TEE(s) in the compute layer as well as the immutable and tamper-resistant permissions blockchain, a user of a client device can trust that data stored and/or processed by the compute nodes is as private and secure as a device at the user's premises or otherwise under the user's full physical control.

As indicated above, FIGS. 1A-1C are provided as one or more examples. Other examples can differ from what is described with regard to FIGS. 1A-1C. For example, implementation(s) 100 may be used to provide security and/or privacy assurances for any suitable client data that may be processed and/or stored in a data center, a multi-access edge computing (MEC) host, a centralized cloud computing environment, and/or the like.

Figure 2:
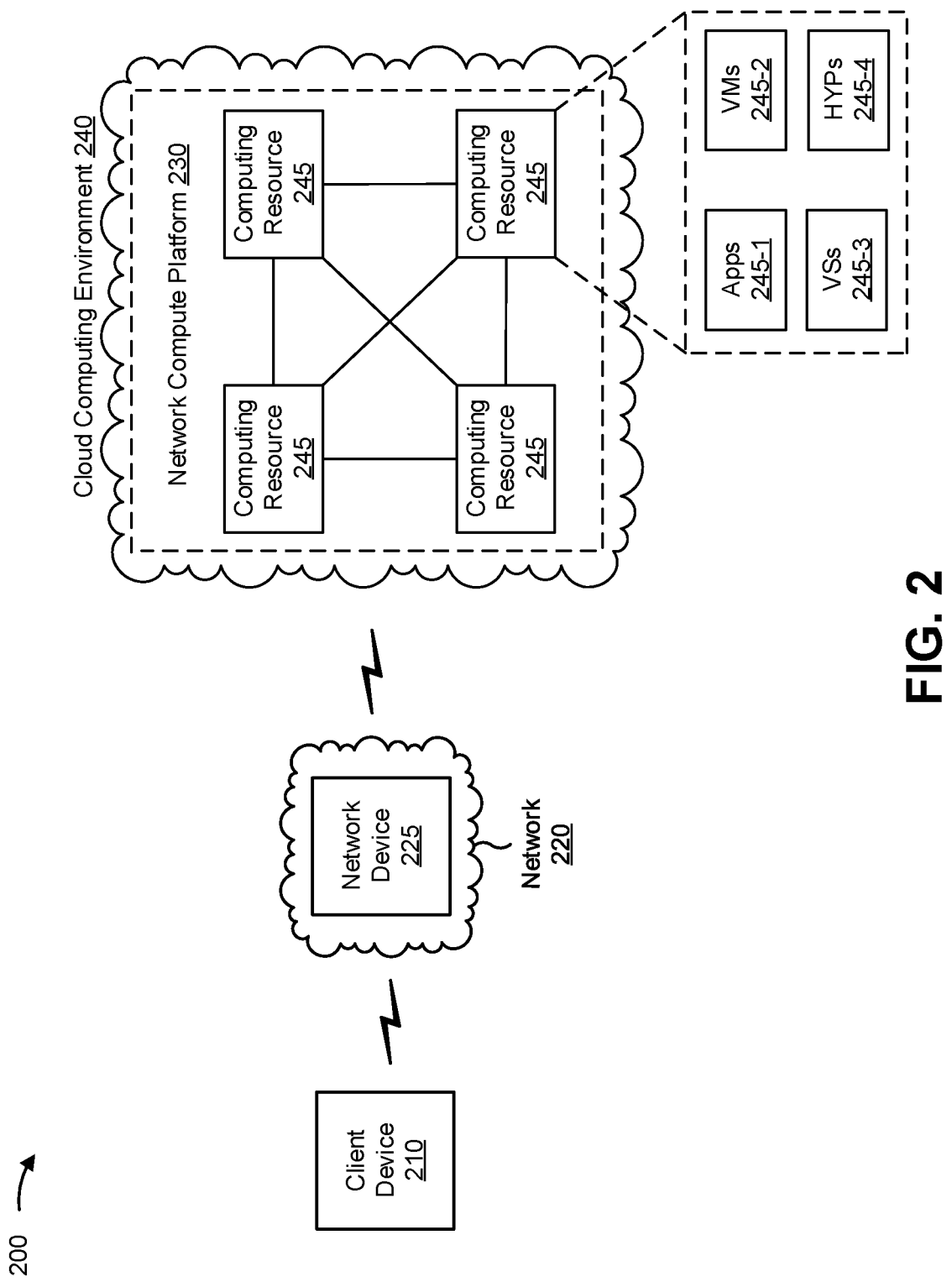
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a network 220 including a network device 225, and a network compute platform 230 in a cloud computing environment 240 including a set of computing resources 245. Devices of environment 200 may interconnect via wired connections, wireless connections, or a combination of wired and wireless connections.

Client device 210 includes one or more devices capable of receiving, generating, storing, processing, and/or providing information associated with a session involving data that is stored and/or processed using network compute platform 230. For example, client device 210 may include a communication and/or computing device, such as a thin client device, a zero client device, a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), a medical device, a connected vehicle, and/or a similar type of device. In some implementations, client device 210 may include a secure element to store one or more cryptographic keys that are used to write entries to a permissions blockchain controlled by client device 210 (e.g., to regulate access to data associated with client device 210), to encrypt and decrypt data associated with the session involving data that is stored and/or processed using network compute platform 230, to communicate with one or more hardware security modules provided in a privacy layer of network compute platform 230, and/or the like.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Network device 225 includes one or more devices (e.g., one or more traffic transfer devices) capable of processing and/or transferring traffic to and/or from client device 210. For example, network device 225 may include a firewall, a router, a gateway, a switch, a hub, a bridge, a reverse proxy, a server (e.g., a proxy server), a security device, an intrusion detection device, a load balancer, or a similar device. Additionally, or alternatively, network device 225 may include one or more devices capable of communicating with client device 210 using a particular radio access technology (RAT). For example, network device 225 may include an access point, a base station, a base transceiver station, a radio base station, a node B, an evolved node B (eNB), a gNB, a base station subsystem, a cellular site, a cellular tower (e.g., a cell phone tower, a mobile phone tower, etc.), a transmit receive point (TRP), a radio access node, a macrocell base station, a microcell base station, a picocell base station, a femtocell base station, or a similar type of device. Network device 225 may transfer traffic between client device 210 (e.g., using a cellular RAT, a wireless local area network (WLAN) RAT, and/or the like), other network devices 225 (e.g., using a wireless interface or a backhaul interface, such as a wired backhaul interface), and/or network 220. Network device 225 may provide one or more cells that cover one or more geographic areas. Some network devices 225 may be mobile. Some network devices 225 may be capable of communicating using multiple RATs (e.g., a cellular RAT and a WLAN RAT, different cellular RATs, and/or the like).

In some implementations, network device 225 may perform scheduling and/or resource management for client devices 210 covered by network device 225 (e.g., client devices 210 covered by a cell provided by network device 225). In some implementations, network devices 225 may be controlled or coordinated by a network controller, which may perform load balancing, network-level configuration, and/or the like. The network controller may communicate with network devices 225 via a wireless or wireline backhaul. In some implementations, network device 225 may include a network controller, a self-organizing network (SON) module or component, or a similar module or component. In other words, a network device 225 may perform network control, scheduling, and/or network management functions (e.g., for other network devices 225/or for uplink, downlink, and/or sidelink communications of client devices 210 covered by the network device 225). In some implementations, network device 225 may include a central unit and multiple distributed units. The central unit may coordinate access control and communication with regard to the multiple distributed units. The multiple distributed units may provide client device 210 and/or other network device 225 with access to network 220.

Network compute platform 230 includes one or more devices capable of receiving, generating, storing, processing, and/or providing information associated with a session that involves storing and/or processing data for client device 210. For example, as described elsewhere herein, network compute platform 230 may be separated into a compute layer that includes hardware resources for storing and/or processing data for client device 210 and a privacy layer that includes hardware resources for protecting privacy and security for the data associated with client device 210. For example, the compute layer may include a compute node having a trusted execution environment for storing and/or processing data for client device 210, and the privacy layer may include a hardware security module to store one or more cryptographic keys for encrypting and decrypting data that is stored and/or processed by the trusted execution environment in the compute layer. In some implementations, the hardware security module and the compute node may be co-located or located in proximity to one another in an edge region of network 220. Additionally, or alternatively, network compute platform 230 may be co-located or located in proximity to network device 225 (e.g., in a multi-access edge computing (MEC) architecture).

In some implementations, as shown, network compute platform 230 can be hosted in a cloud computing environment 240. Notably, while implementations described herein describe network compute platform 230 as being hosted in cloud computing environment 240, in some implementations, network compute platform 230 can be non-cloud-based (e.g., can be implemented outside of a cloud computing environment) or partially cloud-based.

Cloud computing environment 240 includes an environment that hosts network compute platform 230. Cloud computing environment 240 can provide computation services, software services, data access services, storage services, and/or other services that do not require end-user knowledge of a physical location and configuration of system(s) and/or device(s) that host network compute platform 230. In some implementations, cloud computing environment 240 may be deployed in a multi-access edge computing (MEC) architecture, a decentralized fog computing environment, a public or private cloud computing environment, a data center, a compute cluster, and/or the like. As shown, cloud computing environment 240 can include a set of one or more computing resources 245 (referred to collectively as "computing resources 245" and individually as "computing resource 245").

Computing resource 245 includes one or more personal computers, workstation computers, server devices, or other types of computation and/or communication devices. In some implementations, computing resource 245 can host network compute platform 230. The cloud resources can include compute instances executing in computing resource 245, storage devices provided in computing resource 245, data transfer devices provided by computing resource 245, and/or the like. In some implementations, computing resource 245 can communicate with other computing resources 245 via wired connections, wireless connections, or a combination of wired and wireless connections.

As further shown in FIG. 2, computing resource 245 includes a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 includes one or more software applications that can be provided to or accessed by client device 210 and/or the like. Application 245-1 can eliminate a need to install and execute the software applications on client device 210 and/or the like. For example, application 245-1 can include software associated with network compute platform 230 and/or any other software capable of being provided via cloud computing environment 240. In some implementations, one application 245-1 can send information to and/or receive information from one or more other applications 245-1, via virtual machine 245-2.

Virtual machine 245-2 includes a software implementation of a machine (e.g., a computer) that executes programs like a physical machine. Virtual machine 245-2 can be either a system virtual machine or a process virtual machine, depending upon use and degree of correspondence to any real machine by virtual machine 245-2. A system virtual machine can provide a complete system platform that supports execution of a complete operating system ("OS"). A process virtual machine can execute a single program, and can support a single process. In some implementations, virtual machine 245-2 can execute on behalf of a user (e.g., a user of client device 210), and can manage infrastructure of cloud computing environment 240, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system with flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 245-4 can provide hardware virtualization techniques that allow multiple operating systems (e.g., "guest operating systems") to execute concurrently on a host computer, such as computing resource 245. Hypervisor 245-4 can present a virtual operating platform to the guest operating systems, and can manage the execution of the guest operating systems. Multiple instances of a variety of operating systems can share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
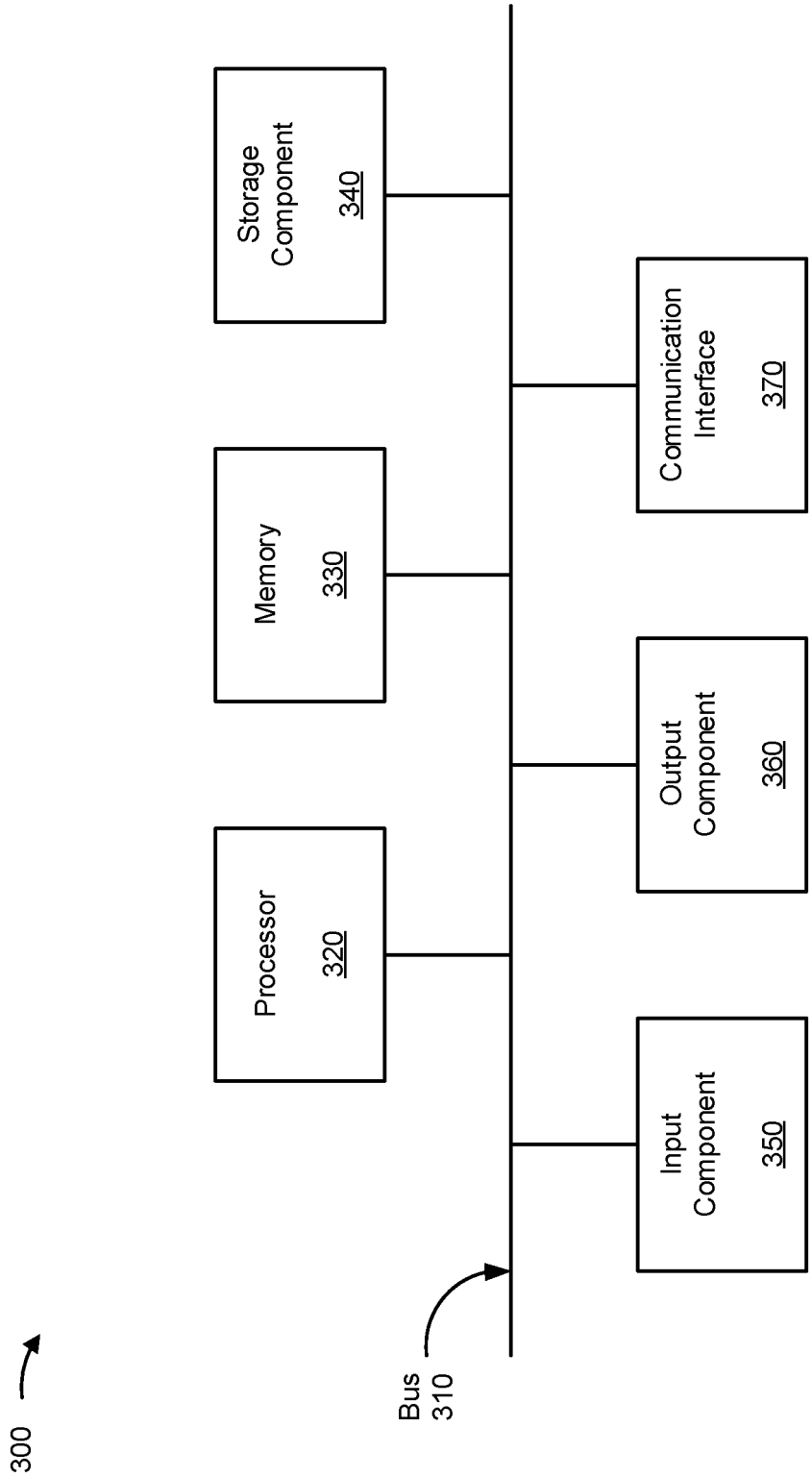
FIG. 3 is a diagram of example components of one or more devices of FIG. 2.

FIG. 3 is a diagram of example components of a device 300. Device 300 may correspond to client device 210, network device 225, and/or thin client compute platform 230. In some implementations, client device 210, network device 225, and/or thin client compute platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
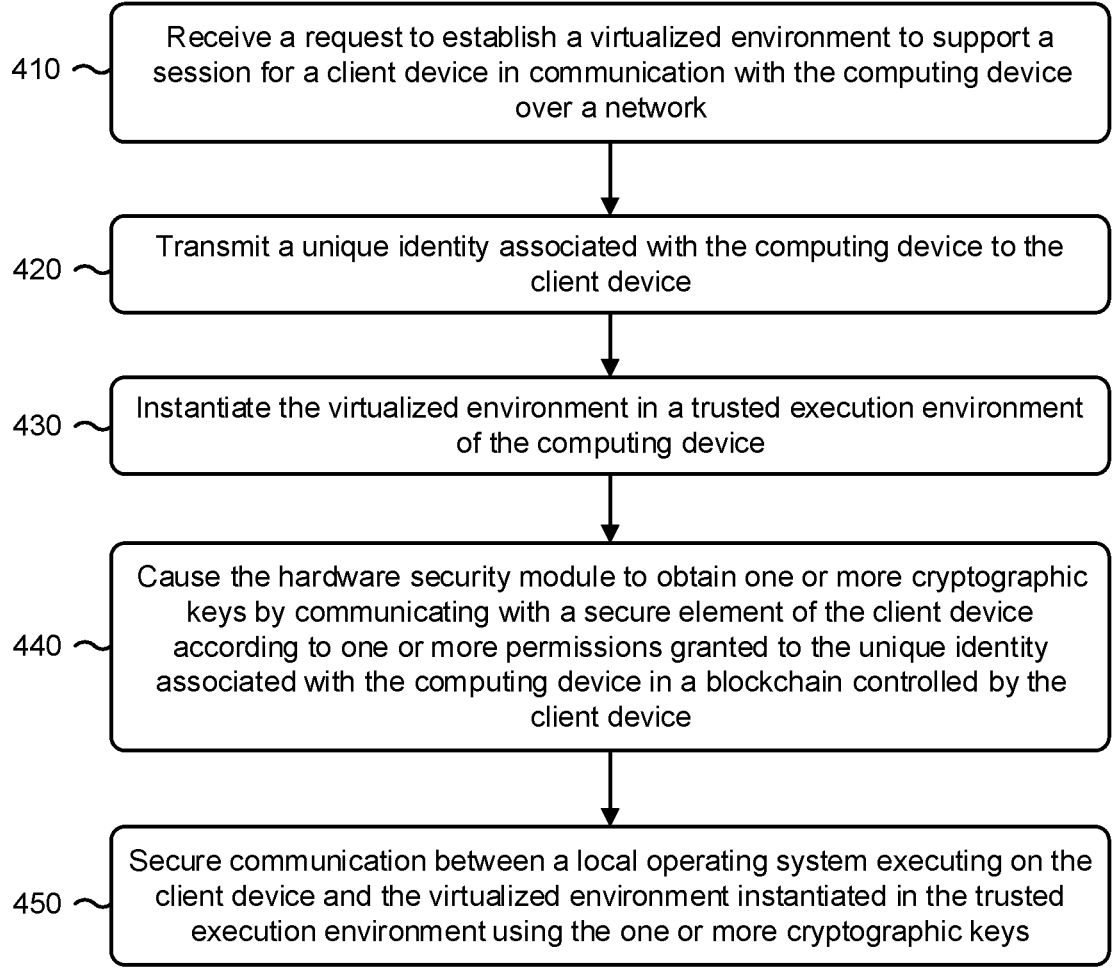
FIG. 4 is a flow chart of an example process for providing a privacy layer to secure client data in a network.

FIG. 4 is a flow chart of an example process 400 for providing a privacy layer to secure client data in a network. In some implementations, one or more process blocks of FIG. 4 may be performed by a computing device, which may correspond to a network compute platform (e.g., network compute platform 230). In some implementations, the computing device that performs one or more process blocks of FIG. 4 can be another device or a group of devices separate from or including the network compute platform, such as a client device (e.g., client device 210), a network device (e.g., network device 225), and/or the like.

As shown in FIG. 4, process 400 may include receiving a request to establish a virtualized environment to support a session for a client device in communication with the computing device over a network (block 410). For example, the computing device (e.g., using computing resource 245, processor 320, memory 330, storage component 340, input component 350, output component 360, communication interface 370, and/or the like) may receive a request to establish a virtualized environment for a client device in communication with the computing device over a network, as described above. In some implementations, the client device may include one or more input devices and one or more output devices configured to interact with the virtualized environment via a graphical user interface.

As further shown in FIG. 4, process 400 may include transmitting a unique identity associated with the computing device to the client device (block 420). For example, the computing device (e.g., using computing resource 245, processor 320, memory 330, storage component 340, input component 350, output component 360, communication interface 370, and/or the like) may transmit a unique identity associated with the computing device to the client device, as described above. In some implementations, the unique identity may be mapped to a hardware security module in communication with the computing device (e.g., a hardware security module co-located with the computing device in an edge region of the network).

As further shown in FIG. 4, process 400 may include instantiating the virtualized environment in a trusted execution environment of the computing device (block 430). For example, the computing device (e.g., using computing resource 245, processor 320, memory 330, storage component 340, input component 350, output component 360, communication interface 370, and/or the like) may instantiate the virtualized environment in a trusted execution environment of the computing device, as described above. In some implementations, the trusted execution environment may include one or more hardware resources that isolate the virtualized environment from a rich execution environment associated with the computing device.

As further shown in FIG. 4, process 400 may include causing the hardware security module to obtain one or more cryptographic keys by communicating with a secure element of the client device according to one or more permissions granted to the unique identity associated with the computing device in a blockchain controlled by the client device (block 440). For example, the computing device (e.g., using computing resource 245, processor 320, memory 330, storage component 340, input component 350, output component 360, communication interface 370, and/or the like) may cause the hardware security module to obtain one or more cryptographic keys by communicating with a secure element of the client device according to one or more permissions granted to the unique identity associated with the computing device in a blockchain controlled by the client device, as described above.

In some implementations, the one or more cryptographic keys may include a public key of the client device and an asymmetric key pair including a public key and a corresponding private key generated by the hardware security module. Additionally, or alternatively, the one or more cryptographic keys may include a symmetric key shared between the hardware security module and the client device. For example, when causing the hardware security module to obtain the one or more cryptographic keys, the computing device may cause the hardware security module to negotiate the symmetric key with the client device based on the one or more permissions recorded in the blockchain granting access to the one or more cryptographic keys for the unique identity mapped to the hardware security module.

As further shown in FIG. 4, process 400 may include securing communication between a local operating system executing on the client device and the virtualized environment instantiated in the trusted execution environment using the one or more cryptographic keys (block 450). For example, the computing device (e.g., using computing resource 245, processor 320, memory 330, storage component 340, input component 350, output component 360, communication interface 370, and/or the like) may secure communication between a local operating system executing on the client device and the virtualized environment instantiated in the trusted execution environment using the one or more cryptographic keys, as described above.

In some implementations, securing the communication between the local operating system executing on the client device and the virtualized environment instantiated in the trusted execution environment may include passing plaintext data to be encrypted from the trusted execution environment to the hardware security module, receiving ciphertext data encrypted using the one or more cryptographic keys from the hardware security module, and transmitting the ciphertext data to the client device over the network. Additionally, or alternatively, securing the communication between the local operating system executing on the client device and the virtualized environment instantiated in the trusted execution environment may include receiving ciphertext data from the client device over the network, passing the ciphertext data to the hardware security module for decryption into cleartext data using the one or more cryptographic keys, and processing the cleartext data in the trusted execution environment.

In some implementations, a request to migrate the one or more cryptographic keys to a target hardware security module mapped to a target computing node may be recorded in the blockchain based on determining that the virtualized environment is to be migrated to the target computing node. For example, the request to migrate the one or more cryptographic keys may be recorded in the blockchain to prompt the client device to modify the one or more permissions granted to the unique identity associated with the computing device in the blockchain controlled by the client device. In some implementations, the one or more cryptographic keys may be migrated to the target hardware security module based on the client device recording one or more entries in the blockchain to revoke the one or more permissions granted to the unique identity associated with the computing device and to grant the one or more permissions to the target hardware security module. For example, when migrating the one or more cryptographic keys, a virtual private network tunnel may be established between the hardware security module and the target hardware security module, the one or more cryptographic keys may be transmitted to the target hardware security module via the virtual private network tunnel, and the one or more cryptographic keys may be deleted from the hardware security module.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   instantiating, by a computing device, a virtualized environment in a trusted execution environment,
      wherein the trusted execution environment includes one or more hardware resources isolating data stored or processed in the trusted execution environment from a rich execution environment associated with the computing device, and
      wherein the computing device is associated with a unique identity mapped to a hardware security module in communication with the computing device;
   causing, by the computing device, the hardware security module to obtain one or more keys by communicating with a secure element of a client device according to one or more permissions granted to the unique identity using a blockchain controlled by the client device,
      wherein the blockchain is configured to limit writing of entries of transactions to the client device; and
   securing, by the computing device, communication between a local operating system executing on the client device and the virtualized environment using the one or more keys, for establishing a chain of trust and regulating interactions between the secure element, the hardware security module, and the trusted execution environment,
      wherein securing the communication between the local operating system executing on the client device and the virtualized environment includes:
         passing ciphertext data to the hardware security module for decryption into cleartext data using the one or more keys; and
         processing the cleartext data in the trusted execution environment.

2. The method of claim 1, wherein the one or more keys comprise information related to:
   one or more symmetric keys, or
   one or more asymmetric keys.

3. The method of claim 1, wherein the hardware security module is co-located with the computing device in an edge region of a network.

4. The method of claim 1, wherein the rich execution environment is used to execute a main operating system.

5. The method of claim 1, wherein applications executed in the trusted execution environment have access to computing resources of the computing device.

6. The method of claim 1, further comprising:
recording, in the blockchain, a request to migrate the one or more keys to a target hardware security module mapped to a target computing node based on determining that the virtualized environment is to be migrated to the target computing node.

7. The method of claim 1, wherein the hardware security module is mapped to a particular identity associated with a computing node associated with the virtualized environment.

8. A non-transitory computer-readable medium storing a set of instructions, the set of instructions comprising:
one or more instructions that, when executed by one or more processors of a computing device, cause the computing device to:
instantiate a virtualized environment in a trusted execution environment,
wherein the trusted execution environment includes one or more hardware resources, isolating data stored or processed in the trusted execution environment from a rich execution environment associated with the computing device, and
wherein the computing device is associated with a unique identity mapped to a hardware security module in communication with the computing device;
cause the hardware security module to obtain one or more keys by communicating with a secure element of a client device according to one or more permissions granted to the unique identity using a blockchain controlled by the client device,
wherein the blockchain is configured to limit writing of entries of transactions to the client device; and
secure communication between a local operating system executing on the client device and the virtualized environment using the one or more keys, for establishing a chain of trust and regulating interactions between the secure element, the hardware security module, and the trusted execution environment,
wherein the one or more instructions, that cause the computing device to secure the communication between the local operating system executing on the client device and the virtualized environment, cause the computing device to:
pass ciphertext data to the hardware security module for decryption into cleartext data using the one or more keys; and
process the cleartext data in the trusted execution environment.

9. The non-transitory computer-readable medium of claim 8, wherein the one or more keys comprise information related to:
one or more symmetric keys, or
one or more asymmetric keys.

10. The non-transitory computer-readable medium of claim 8, wherein the hardware security module is co-located with the computing device in an edge region of a network.

11. The non-transitory computer-readable medium of claim 8, wherein the rich execution environment is used to execute a main operating system.

12. The non-transitory computer-readable medium of claim 8, wherein applications executed in the trusted execution environment have access to computing resources of the computing device.

13. The non-transitory computer-readable medium of claim 8, wherein the one or more instructions further cause the computing device to:
record, in the blockchain, a request to migrate the one or more keys to a target hardware security module mapped to a target computing node based on determining that the virtualized environment is to be migrated to the target computing node.

14. The non-transitory computer-readable medium of claim 8, wherein the one or more instructions further cause the computing device to:
record a transaction in the blockchain associated with modifying an identity of the hardware security module.

15. A device, comprising:
one or more processors configured to:
instantiate a virtualized environment in a trusted execution environment,
wherein the trusted execution environment includes one or more hardware resources, isolating data stored or processed in the trusted execution environment from a rich execution environment associated with the device, and
wherein the device is associated with a unique identity mapped to a hardware security module in communication with the device;
cause the hardware security module to obtain one or more keys by communicating with a secure element of a client device according to one or more permissions granted to the unique identity using a blockchain controlled by the client device,
wherein the blockchain is configured to limit writing of entries of transactions to the client device; and
secure communication between a local operating system executing on the client device and the virtualized environment using the one or more keys, for establishing a chain of trust and regulating interactions between the secure element, the hardware security module, and the trusted execution environment,
wherein the one or more processors, to secure the communication between the local operating system executing on the client device and the virtualized environment, are configured to:
pass ciphertext data to the hardware security module for decryption into cleartext data using the one or more keys; and
process the cleartext data in the trusted execution environment.

16. The device of claim 15, wherein the one or more keys comprise information related to:
one or more symmetric keys, or one or more asymmetric keys.

17. The device of claim 15, wherein the hardware security module is co-located with the device in an edge region of a network.

18. The device of claim 15, wherein the rich execution environment is used to execute a main operating system.

19. The device of claim 15, wherein the one or more processors are further configured to:
record, in the blockchain, a request to migrate the one or more keys to a target hardware security module mapped to a target computing node based on determining that the virtualized environment is to be migrated to the target computing node.

20. The device of claim 15, wherein the one or more processors are further configured to:

determine whether a transaction granting the hardware security module access to the one or more keys is recorded in the blockchain.

\* \* \* \* \*